(Model.)
E. KEMPER.
HAND SEEDER.
No. 244,905.                    Patented July 26, 1881.
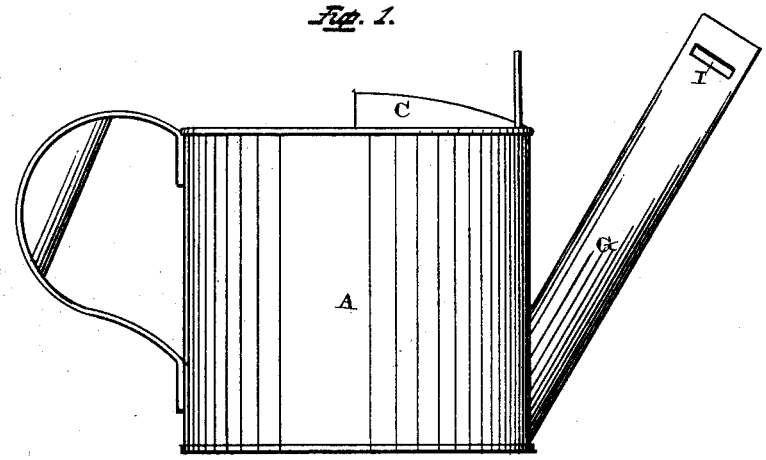
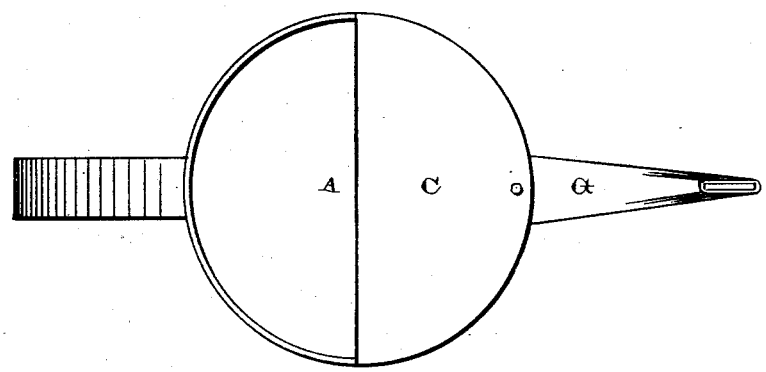
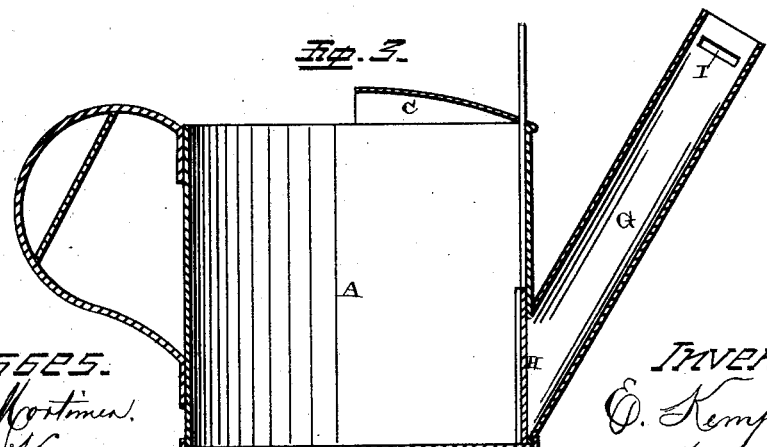

UNITED STATES PATENT OFFICE.

ELIJAH KEMPER, OF THORNVILLE, OHIO.

HAND-SEEDER.

SPECIFICATION forming part of Letters Patent No. 244,905, dated July 26, 1881.

Application filed June 28, 1881. (Model.)

*To all whom it may concern:*

Be it known that I, ELIJAH KEMPER, of Thornville, in the county of Perry and State of Ohio, have invented certain new and useful Improvements in Hand-Seeders; and I do hereby declare the following to be a full, clear, and exact description of the invention, such as will enable others skilled in the art to which it pertains to make and use it, reference being had to the accompanying drawings, which form part of this specification.

My invention relates to an improvement in hand-seeders; and it consists in a can or vessel provided with a handle so as to be swung from side to side, a valve to control the flow of seed, and a spout having its outer end contracted so as to prevent the too free escape of the seed therefrom, and suitable openings made through the spout on opposite sides near its contracted end, as will be more fully described hereinafter.

The object of my invention is to provide a cheap and simple broadcast-seeder which will scatter the seed evenly and speedily over the ground with very little exertion to the one doing the seeding.

Figure 1 is a side elevation of my invention. Fig. 2 is a plan view of the same. Fig. 3 is a vertical section, taken through the center of the nozzle.

A represents a can or vessel of any desired size, which is provided with a handle, by means of which it may be swung freely from side to side as the operator passes along over the ground. This can or vessel is provided with an arched cover, C, which extends partially over the top of the can, leaving an opening sufficiently large for the seed to be readily poured in. Projecting from the bottom of this can, at the side opposite to the handle is the spout G, the entrance to which is controlled by means of a valve, H, so that the flow of seed can be readily regulated. This valve may have a rod attached to it which will extend up through the top of the can, so that the valve can be readily adjusted into any desired position. This valve is thus made adjustable, so that the amount of seed to be sowed to the acre can be easily controlled. The outer end of this spout is flattened, as shown, so as to prevent the too free escape of the seed from the spout, whereby they would be sowed too thickly over the ground. By thus contracting the nozzle the seed can only escape in a long continuous stream, whereby as the can is swung from side to side they will be easily and readily distributed over the ground. In order to provide a more free escape for the seed, slots I are made through the sides of the spout of the can. These slots are elongated and placed just opposite to each other in the flattened sides of the tube or spout. Through the three openings shown the seed escapes in three continuous small streams, so as to scatter the seed evenly over the ground.

The great advantage in a seeder like the one above described consists in the ease with which it can be carried around and managed at all times.

I am aware that a pouch or bag that is suspended upon the body and provided with a discharge-tube for scattering the seed is not new, and this I disclaim.

Having thus described my invention, I claim—

A hand-seeder composed of a can or vessel provided with a valve for regulating the flow of the seed and the spout having its outer end contracted, and holes made through opposite sides of the spout near this contracted end, substantially as shown and described.

In testimony whereof I affix my signature in presence of two witnesses.

ELIJAH KEMPER.

Witnesses:
D. D. AVEY,
J. W. MANLY.